United States Patent
Liu et al.

(10) Patent No.: US 12,535,177 B2
(45) Date of Patent: Jan. 27, 2026

(54) SUPPORT DEVICE AND ELECTRONIC APPARATUS

(71) Applicant: Lenovo (Beijing) Limited, Beijing (CN)

(72) Inventors: Yuanqing Liu, Beijing (CN); Jun Wei, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 582 days.

(21) Appl. No.: 18/055,077

(22) Filed: Nov. 14, 2022

(65) Prior Publication Data

US 2023/0213142 A1    Jul. 6, 2023

(30) Foreign Application Priority Data

Dec. 31, 2021   (CN) .................. 202111673407.7

(51) Int. Cl.
| | | |
|---|---|---|
| *F16M 11/12* | (2006.01) | |
| *F16C 11/04* | (2006.01) | |
| *F16M 11/14* | (2006.01) | |
| *F16M 11/20* | (2006.01) | |

(52) U.S. Cl.
CPC ........... *F16M 11/123* (2013.01); *F16C 11/04* (2013.01); *F16M 11/14* (2013.01); *F16M 11/2028* (2013.01); *F16M 2200/08* (2013.01); *Y10T 403/32581* (2015.01)

(58) Field of Classification Search
CPC .. F16M 11/123; F16M 11/14; F16M 11/2028; F16M 2200/08; F16C 11/04; F16C 11/06; F16C 11/0604; Y10T 403/32581

USPC ......................................................... 248/371
See application file for complete search history.

(56) References Cited

U.S. PATENT DOCUMENTS

| | | | | |
|---|---|---|---|---|
| 6,343,006 | B1* | 1/2002 | Moscovitch | B60R 11/0235 361/679.04 |
| 8,462,103 | B1* | 6/2013 | Moscovitch | F16M 13/02 345/55 |
| 10,925,798 | B2* | 2/2021 | Ishibashi | F16C 11/06 |
| 2008/0055832 | A1* | 3/2008 | Ozolins | F16M 11/14 361/679.04 |
| 2017/0269460 | A1* | 9/2017 | Fagerkvist | F16M 11/14 |
| 2018/0320813 | A1* | 11/2018 | Karman | F16C 11/0604 |
| 2019/0003531 | A1* | 1/2019 | Yoon | F16M 11/14 |
| 2023/0175637 | A1* | 6/2023 | Mazur | F16C 11/0647 248/127 |

FOREIGN PATENT DOCUMENTS

| | | |
|---|---|---|
| CN | 101551053 A | 10/2009 |
| CN | 211599978 U | 9/2020 |
| CN | 112393080 A | 2/2021 |

* cited by examiner

*Primary Examiner* — Christopher Garft
(74) *Attorney, Agent, or Firm* — ANOVA LAW GROUP, PLLC

(57) ABSTRACT

A support device includes a support structure and a carrier assembly. The support structure includes a connection groove. The carrier assembly is configured to support a host system and/or a display device and includes a first connector. At least a part of the first connector is located in the connection groove and sliding in the connection groove. An angle between the host system and/or the display device and the support structure is adjusted in a first direction and/or a second direction by sliding the first connector in the connection groove.

18 Claims, 26 Drawing Sheets

SUPPORT DEVICE AND ELECTRONIC APPARATUS

CROSS-REFERENCE TO RELATED APPLICATION

This application claims priority to Chinese Patent Application No. 202111673407.7, filed on Dec. 31, 2021, the entire content of which is incorporated herein by reference.

TECHNICAL FIELD

The present disclosure relates to a support device and an electronic apparatus.

BACKGROUND

A support device is a commonly used device. However, the current support device has limited variety and poor adaptability.

SUMMARY

Embodiments of the present disclosure provide a support device, including a support structure and a carrier assembly. The support structure includes a connection groove. The carrier assembly is configured to support a host system and/or a display device and includes a first connector. At least a part of the first connector is located in the connection groove and sliding in the connection groove. An angle between the host system and/or the display device and the support structure is adjusted in a first direction and/or a second direction by sliding the first connector in the connection groove.

Embodiments of the present disclosure provide an electronic apparatus, including a host system and/or a display device, and a support device. The support structure includes a connection groove. The carrier assembly is configured to support a host system and/or a display device and includes a first connector. At least a part of the first connector is located in the connection groove and sliding in the connection groove. The host system and/or the display device are connected to the carrier assembly. An angle between the host system and/or the display device and the support structure is adjusted in a first direction and/or a second direction by sliding the first connector in the connection groove.

The support device of embodiments of the present disclosure may include the support structure including the connection groove and the carrier assembly at least configured to support the host system and/or the display device. The carrier assembly may include the first connector. At least a part of the first connector may be located in the connection groove and may slide in the connection groove. The angles between the host system and/or the display device and the support structure in the first direction and/or the second direction may be adjusted by sliding the first connector into the connection groove. Thus, the angle of the host system and/or the display device may be adjusted through the support device to cause the host system and/or the display device to have different states, which greatly improves the adaptability of the support device and the host system and/or the display device.

REFERENCE NUMERALS

Figure 1:
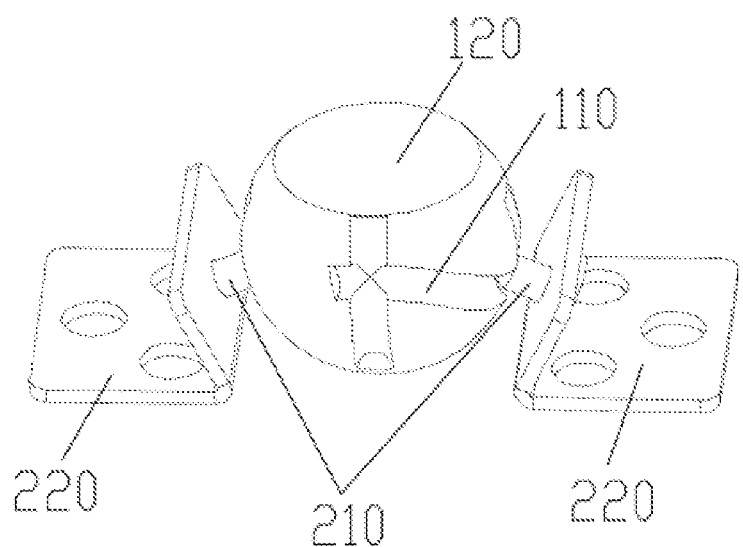
FIG. 1 illustrates a schematic structural diagram of a part of a support device according to embodiments of the present disclosure.

| | | |
|---|---|---|
| 100 Support structure; | 110 Connection groove; | 111 First arc-shaped groove; |
| 112 Second arc-shaped groove; | | 120 Second connector; |
| 130 Column; | 140 Base; | 150 Beam; |
| 200 Carrier assembly; | 210 First connector; | 220 Fixing member; |
| 230 Carrier; | 231 Second convex member; | 310 Backplate; |
| 320 Rotary connector; | 321 Rod-shaped member; | 322 Snap hook; |
| 330 Accommodation groove; | 340 First concave member; | 410 Display device. |

DETAILED DESCRIPTION OF THE EMBODIMENTS

The technical solutions of the present disclosure are further described below with reference to the accompanying drawings and specific embodiments of the present disclosure.

In the description of embodiments of the present disclosure, unless otherwise specified and limited, the term "connection" should be understood in a broad sense. For example, the "connection" may be an electrical connection, or internal communication between two components, or a direct connection, and may also be an indirect connection through an intermediate medium. For those of ordinary skill in the art, specific meanings of the above term can be understood according to specific situations.

The term "first\second\third" involved in embodiments of the present disclosure is only used to distinguish similar objects and does not represent a specific order of the objects. For the "first\second\third," a specific order or sequence may be interchanged where permitted. The objects distinguished by "first\second\third" may be interchanged under an appropriate circumstance. Thus, embodiments of the present disclosure described here may be practiced in a sequence other than a sequence illustrated or described here.

A support device of embodiments of the present disclosure is described in detail below with reference to FIGS. 1 to 33.

The support device may include a support structure 100 and a carrier assembly 200. The support structure 100 may include a connection groove 110. The carrier assembly 200 may be at least configured to support a host system and/or a display device 410. The carrier assembly 200 may include a first connector 210. At least a part of the first connector 210 may be located in the connection groove 110. The least a part of the first connector 210 may slide in the connection groove 110. An angle between the host system and/or the display device 410 and the support structure 100 may be adjusted in a first direction and/or a second direction by sliding the first connector 210 in the connection groove 110. The angle between the host system and/or the display device 410 and the carrier structure may be adjusted in the first direction by sliding the first connector 210 in the connection groove 110. The angle between the host system and/or the display device 410 and the carrier structure may be adjusted in the second direction by sliding the first connector 210 in the connection groove 110. The angles between the host system and/or the display device 410 and the carrier structure may be adjusted in the first direction and in the second direction by sliding the first connector 210 in the connection groove 110. Thus, the host system and/or the display device 410 may have different states by adjusting the angle of the host system and/or the display device 410 through the carrier device, which greatly improves the adaptability of the carrier device and the host system and/or the display device 410.

Figure 2:
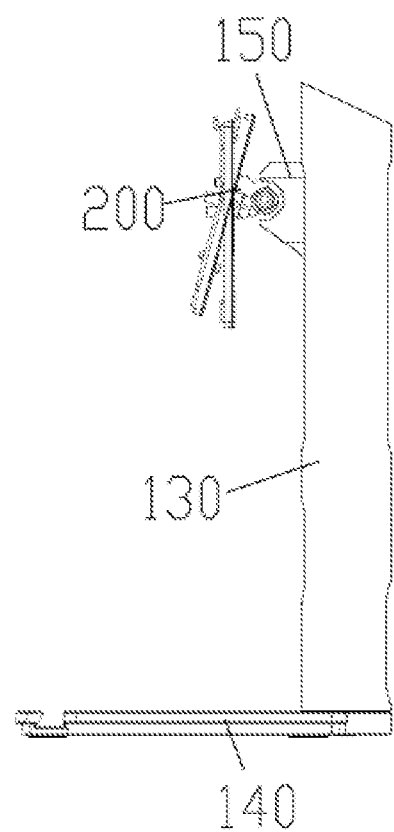
FIG. 2 illustrates a schematic structural diagram of a support device according to embodiments of the present disclosure.
Figure 3:
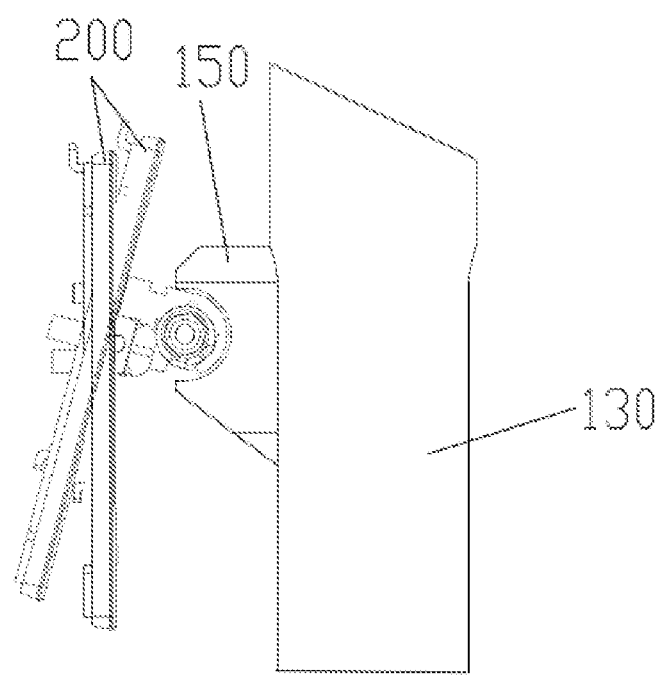
FIG. 3 illustrates a schematic structural diagram of a part of a support device according to embodiments of the present disclosure.

In embodiments of the present disclosure, a structure of the support structure 100 is not limited, as long as the support structure 100 has the connection groove 110. For example, as shown in FIG. 1, the support structure 100 includes a second connector 120. The connection groove 110 is arranged on the second connector 120. For another example, the support structure 100 includes a base 140, a column 130 arranged on the base 140 in a vertical direction and the second connector 120 arranged on a top end of the column 130. The connection groove 110 is arranged on the second connector 120. For another example, as shown in FIGS. 2 and 3, the support structure 100 includes the base 140, the column 130 arranged on the base 140 in a vertical direction, and a beam 150 arranged on the column 130. A first end of the beam 150 may be fixedly connected to the top end of the column 130. The second connector 120 is arranged at a second end of the beam 150. The connection groove 110 is disposed on the second connector 120. The structure of the second connector 120 is not limited. For example, as shown in FIG. 1, the second connector 120 including the connection groove 110 may have a spherical structure. A structure of the base 140 is not limited. For example, the base 140 may have a plate-shaped structure. A structure of the beam 150 is not limited. For an example, as shown in FIGS. 2 and 3, the beam 150 has a block-shaped structure. For another example, the beam 150 may have a rod-shaped structure.

A shape of the connection groove 110 is not limited. For example, the connection groove 110 may include an arc-shaped groove.

In embodiments of the present disclosure, the carrier assembly 200 may be at least configured to support the host system and/or the display device 410. The structure of the carrier assembly 200 is not limited, as long as the carrier assembly 200 includes the first connector 210. For example, as shown in FIG. 1, the carrier assembly 200 includes a fixing member 220. The first connector 210 is connected to the fixing member 220. The fixing member 220 may be configured to be connected to the host system and/or the display device 410.

In embodiments of the present disclosure, the structure of the first connector 210 is not limited. For example, the first connector 210 may have a strip-shaped structure. For example, the first connector 210 may have a column-shaped structure.

The host system may be a host of an electronic apparatus. For example, the host system may be a host system of an all-in-one computer.

The display device 410 may be a display of the electronic apparatus. For example, the display device 410 may be a computer monitor or a television monitor.

In embodiments of the present disclosure, an implementation manner of adjusting the angle between the host system and/or the display device 410 and the support structure 100 in the first direction and/or the second direction by sliding the first connector 210 in the connection groove 110 is not limited.

The first direction and the second direction are not limited. For example, the first direction may be a pitch angle direction of the host system and/or the display device 410. The second direction may be a direction of switching the host system and/or the display device 410 between a landscape state and a portrait state.

For example, the connection groove 110 may include an arc-shaped groove arranged along the first direction. Thus, the angle between the host system and/or the display device 410 and the support structure 100 in the first direction may be adjusted by sliding the first connector 210 in the connection groove 110.

For another example, the connection groove 110 may include an arc-shaped groove arranged along the second direction. Thus, the angle between the host system and/or the display device 410 and the support structure 100 in the second direction may be adjusted by sliding the first connector 210 in the connection groove 110.

For another example, the connection groove 110 may include the arc-shaped groove arranged along the second direction and the arc-shaped groove arranged along the first direction. Thus, the angle between the host system and/or the display device 410 and the carrier structure in the first direction and/or the second direction may be adjusted by sliding the support structure 100 in connection groove 110.

Figure 4:
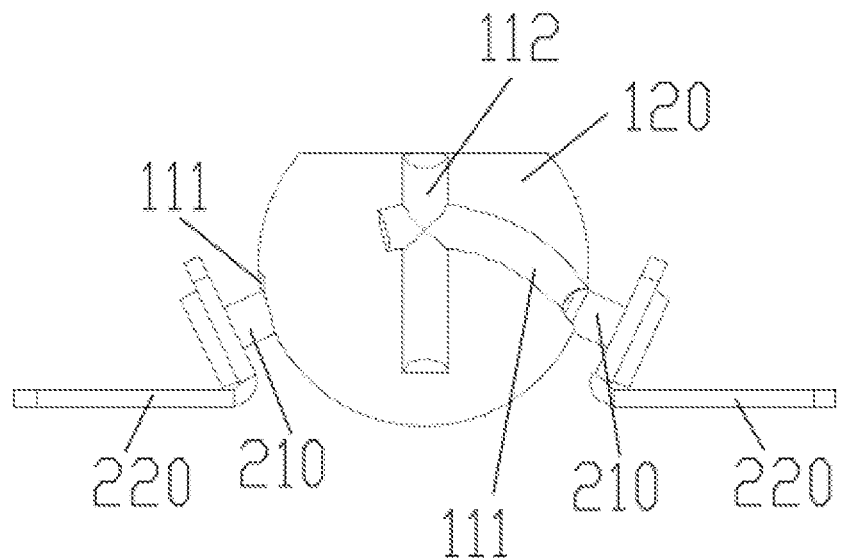
FIG. 4 illustrates a schematic structural diagram of a part of a support device according to embodiments of the present disclosure.
Figure 5:
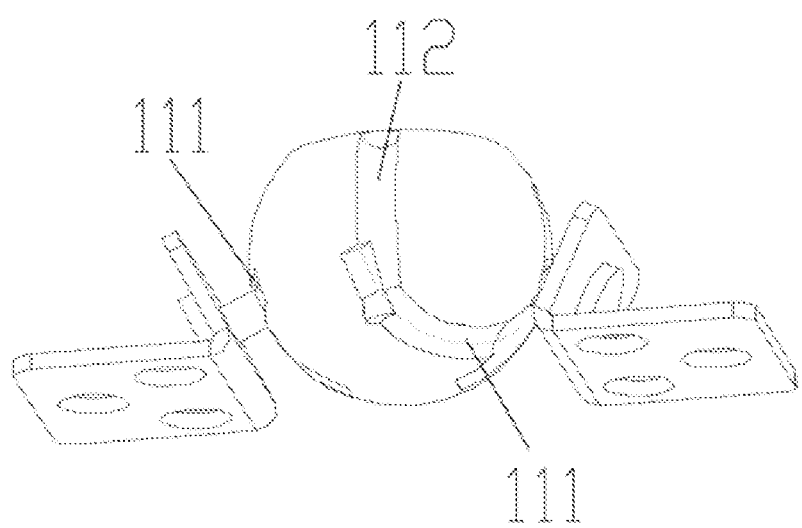
FIG. 5 illustrates a schematic structural diagram of a part of a support device according to embodiments of the present disclosure.

In embodiments of the present disclosure, as shown in FIG. 4 and FIG. 5, the connection groove 110 includes two first arc-shaped grooves 111 arranged opposite to each other. Two first connectors 210 are arranged correspondingly. At least a part of the two first connectors 210 may be correspondingly arranged in the two first arc-shaped grooves 111. The angles between the host system and/or the display device 410 and the support structure 100 in the first direction and/or the second direction may be adjusted by sliding the two first connectors 210 in the corresponding first arc-shaped grooves 111, respectively.

In some embodiments, the two first connectors 210 may be directly connected to the host system and/or the display device 410 or may be connected to the host system and/or the display device 410 through other structural components.

Figure 6:
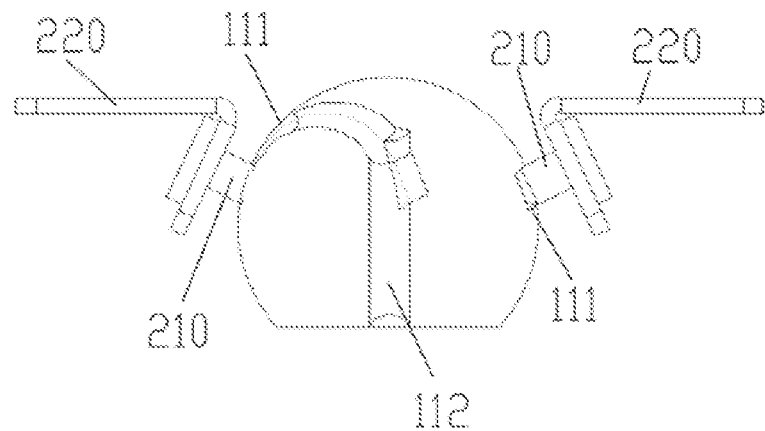
FIG. 6 illustrates a schematic structural diagram of a part of a support device according to embodiments of the present disclosure.

For example, as shown in FIG. 6, the carrier assembly 200 further includes a fixing member 220. Two first connectors 210 are arranged. Two fixing members 220 are arranged corresponding to the first connectors 210. An end of the first connector 210 protruding from the connection groove 110 may be fixedly connected to a first fixing piece of the fixing member 220. A second fixing piece of the fixing member 220 may be mounted and fixed at a mounting member of the host system and/or the display device. The two fixing members 220 may be arranged at an interval on two opposite sides of the second connector 120.

The structure of the fixing member 220 is not limited. For example, as shown in FIG. 6, the first fixing piece of the fixing member 220 and the second fixing piece of the fixing member 220 may both have a plate-shaped structure. The first fixing piece of the fixing member 220 and the second fixing piece of the fixing member 220 may form the first included angle. The value of the first angle is not limited. For example, the first included angle may be 90 degrees.

The structure of the mounting member of the host system and/or the display device 410 is not limited. For example, the mounting member of the host system and/or the display device 410 may be a plate-like structure.

Figure 10:
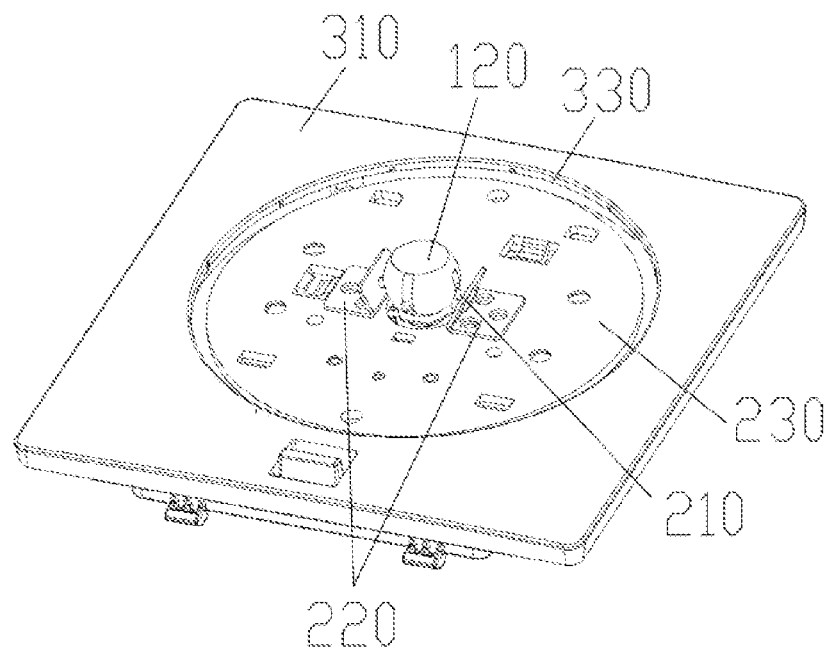
FIG. 10 illustrates a schematic structural diagram of a part of a support device according to embodiments of the present disclosure.
Figure 11:
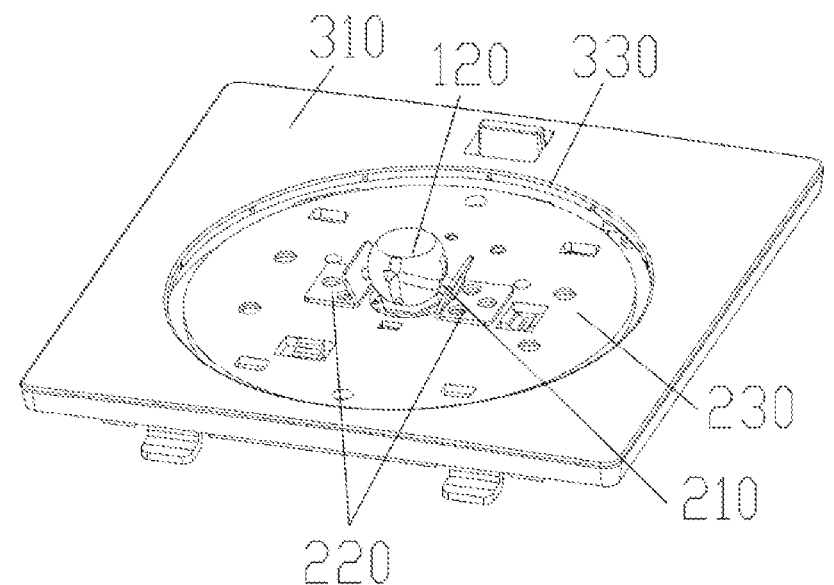
FIG. 11 illustrates a schematic structural diagram of a part of a support device according to embodiments of the present disclosure.

For another example, as shown in FIG. 10 and FIG. 11, the carrier assembly 200 further includes the fixing member 220 and a carrier 230. The mounting member may be an accommodation groove 330 arranged on a back plate of the host system and/or display device 410. At least a part of the carrier 230 may be accommodated in the accommodation groove 330 and rotatably connected to the back plate. The two fixing members 220 may be on a side of the carrier 230 facing away from the at the interval. An angle between the host system and/or the display device 410 and the support structure 100 in a third direction may be adjusted through a relative rotation between the accommodation groove 330 and the carrier 230.

Figure 12:
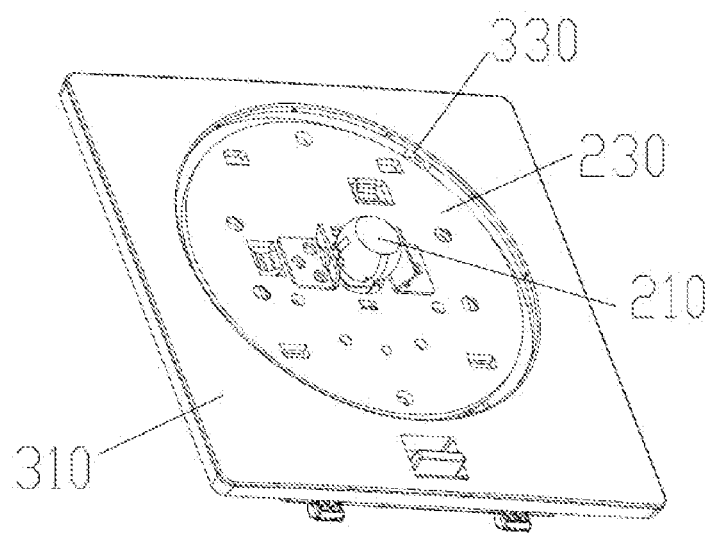
FIG. 12 illustrates a schematic structural diagram of a part of a support device according to embodiments of the present disclosure.

In some embodiments, the structure of the carrier 230 is not limited. For example, as shown in FIG. 12, the carrier 230 has a disc-shaped structure.

In some embodiments, the structure of the back plate 310 is not limited. For example, as shown in FIG. 12, the back plate 310 may have a similar plate-shaped structure.

In this example, the shape of the receiving groove 330 may match the shape of the carrier 230. For example, as shown in FIG. 13, the accommodation groove 330 may have a column-shaped structure.

A guide mechanism may be arranged on a side wall of the accommodation groove 330. The guide mechanism may be configured to provide a guidance function for the carrier 230 to rotate in the accommodation groove 330. The structure of the guide mechanism is not limited. For example, the guide mechanism may be a guide rail arranged on the side wall of the accommodation groove 330 or may be a guide groove arranged on the side wall of the accommodation groove 330.

In some embodiments, an implementation manner of the rotation connection between the carrier 230 and the back plate 310 is not limited. For example, the carrier 230 and the back plate 310 may be rotatably connected through a rotation shaft assembly.

Figure 13:
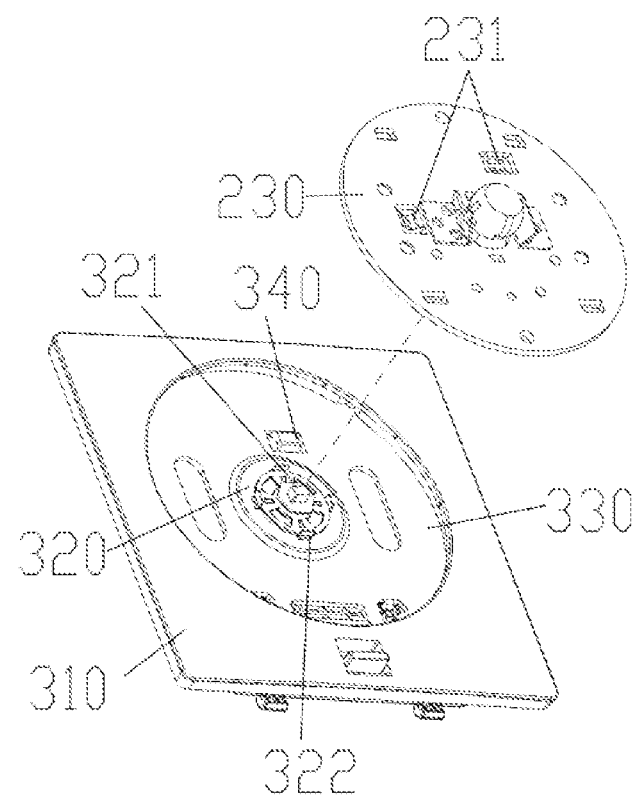
FIG. 13 illustrates a schematic exploded diagram of a support device according to embodiments of the present disclosure.

For example, as shown in FIG. 13, a rotary connector 320 is arranged in the accommodation groove 330. The rotary connector 320 may rotate relative to the back plate 310. The carrier 230 may be detachably and rotatably connected to the back plate 310 through the rotary connector 320.

The structure of the rotary connector 320 is not limited, as long as the carrier 230 is detachably and rotatably connected to the back plate 310 through the rotary connector 320. For example, as shown in FIG. 13, the rotary connector 320 includes a rod-shaped member 321 and a snap hook 322. The carrier 230 includes a positioning hole and a snap groove. The rod-shaped member 321 may be inserted in the positioning hole. The snap hook 322 may be snapped at the snap groove. Thus, the carrier 230 may be detachably connected to the rotary connector 320 through the positioning hole and the snap groove.

The rotary connector 320 may be rotatably connected to the back plate 310 through the rotation shaft structure.

In some embodiments, the accommodation groove 330 may further be provided with a position-limiting structure configured to limit a relative rotation angle between the carrier 230 and the back plate 310.

The position-limiting structure is not limited. For example, as shown in FIG. 13, the position limiting structure includes a first convex member 340 arranged at the accommodation groove 330. Two second convex members 231 may be arranged at the carrier 230. When the carrier 230 rotates relative to the back plate 310, the first convex member 340 may rotate between the two second convex members 231. Thus, the relative rotation angle between the carrier 230 and the back plate 310 may be limited by rotating the first convex member 340 between the two second convex members 231.

In some embodiments, the shape of the first arc-shaped groove 111 is not limited. For example, the first arc-shaped groove 111 may include a first portion and a second portion. The first portion may be arranged in the first direction, and the second portion may be arranged in the second direction. The two first connectors 210 may slide in the first portion to adjust the angle between the first connector 210 and the support structure 100 in the first direction. The two first connectors 210 may slide in the second portion to adjust the angle between the first connector 210 and the support structure 100 in the second direction.

The first arc-shaped groove 111 may be arranged only along the first direction or only along the second direction.

Figure 8:
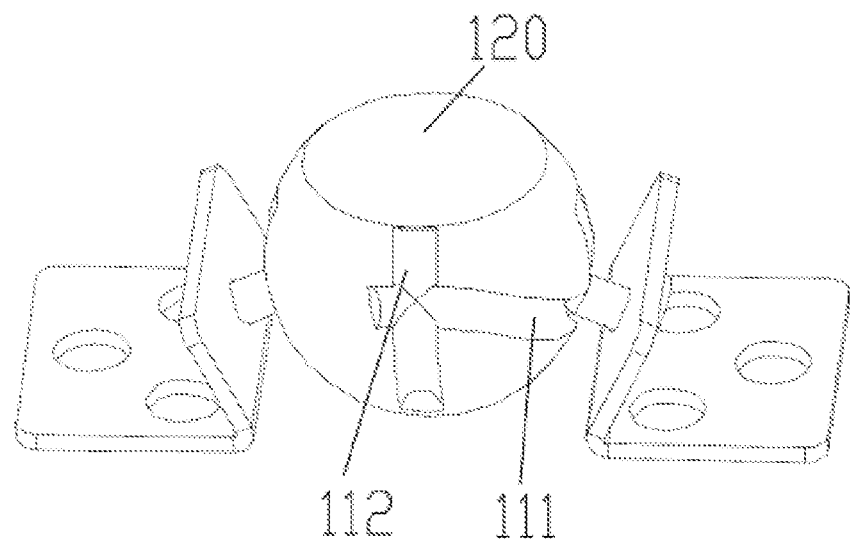
FIG. 8 illustrates a schematic structural diagram of a part of a support device according to embodiments of the present disclosure.
Figure 9:
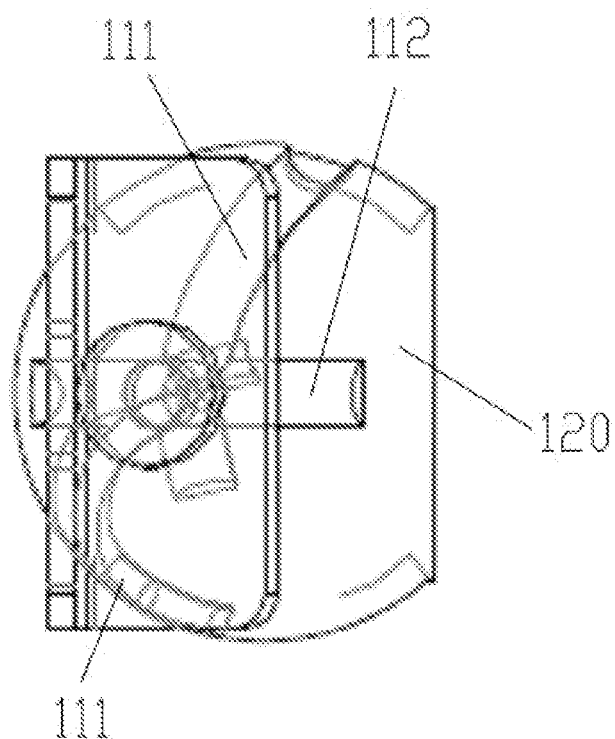
FIG. 9 illustrates a schematic structural diagram of a part of a support device according to embodiments of the present disclosure.

In some embodiments, as shown in FIG. 9, the two first arc-shaped grooves 111 are correspondingly arranged on a surface of the spherical structure. Radians corresponding to the two first arc-shaped grooves 111 may be different. As shown in FIG. 5 and FIG. 8, when the two first connectors 210 slide in the two first arc-shaped grooves 111 with different radians, distances between the two first connectors 210 and the support structure 100 may be different. A first connector 210 of the two first connectors 210 may have a first distance with the support structure 100. The other first connector 210 of the two first connectors 210 may have a second distance with the support structure 100. The first distance may be different from the second distance. Thus, two points of the two first connectors 210 supporting the host system and/or the display device 410 may deviate to support the angle adjustment between the host system and/or the display device 410 and the support structure 100 in the first direction. Meanwhile, when the two first connectors 210 slide in the two first arc-shaped grooves 111 with different radians, the angle adjustment of the host system and/or the display device 410 and the support structure 100 may be supported in the second direction.

Figure 14:
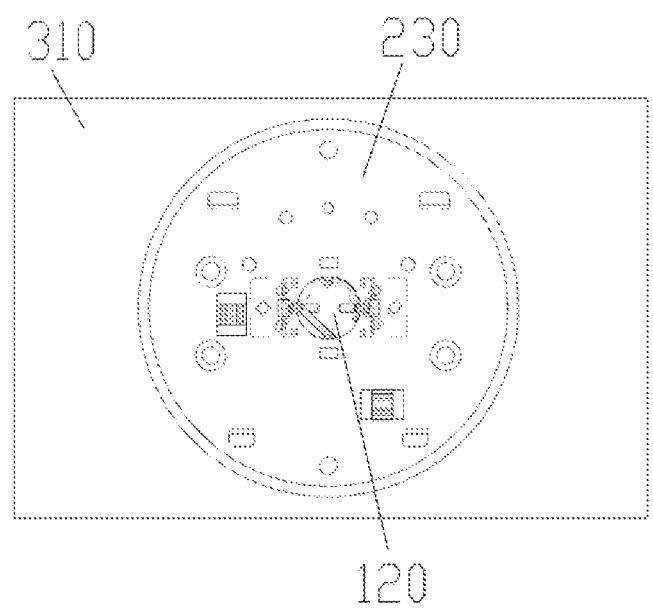
FIG. 14 illustrates a schematic structural diagram of a part of a support device according to embodiments of the present disclosure.
Figure 15:
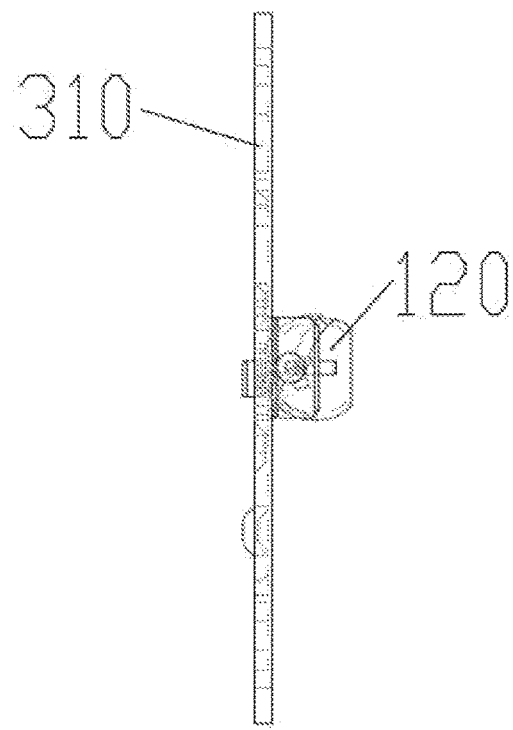
FIG. 15 illustrates a schematic structural diagram of a part of a support device according to embodiments of the present disclosure.
Figure 16:
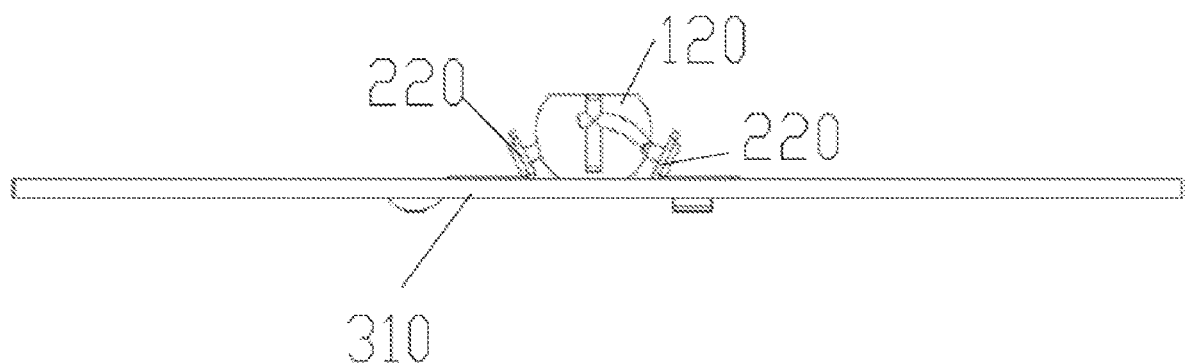
FIG. 16 illustrates a schematic structural diagram of a part of a support device according to embodiments of the present disclosure.
Figure 17:
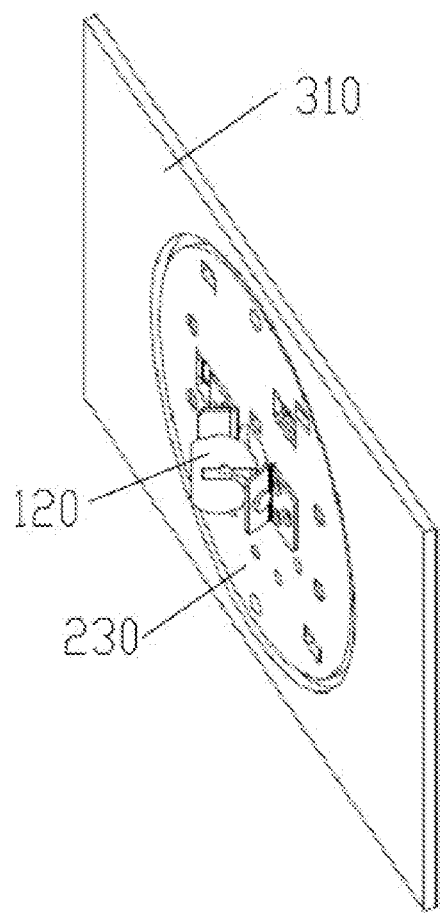
FIG. 17 illustrates a schematic structural diagram of a part of a support device according to embodiments of the present disclosure.
Figure 18:
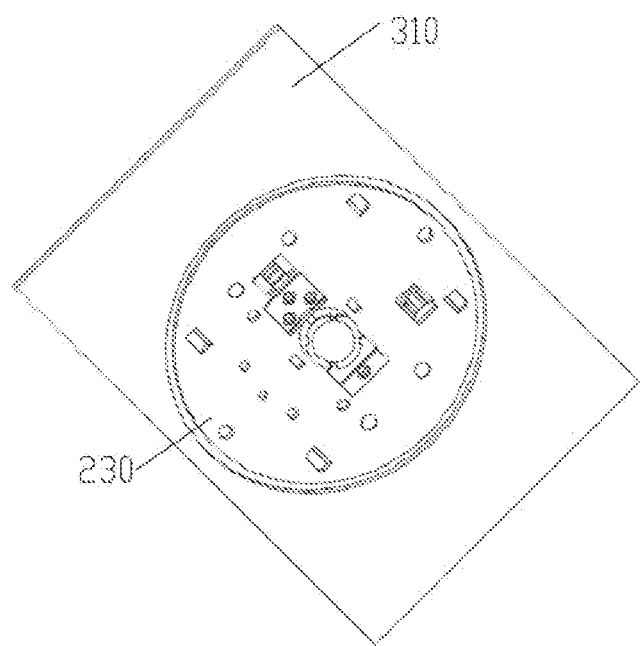
FIG. 18 illustrates a schematic structural diagram of a part of a support device according to embodiments of the present disclosure.
Figure 19:
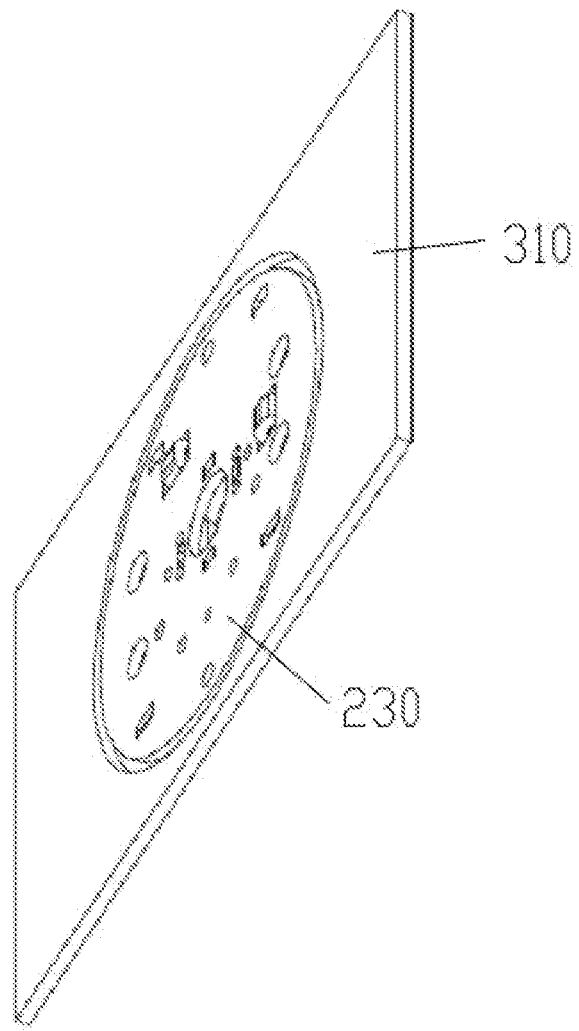
FIG. 19 illustrates a schematic structural diagram of a part of a support device according to embodiments of the present disclosure.
Figure 20:
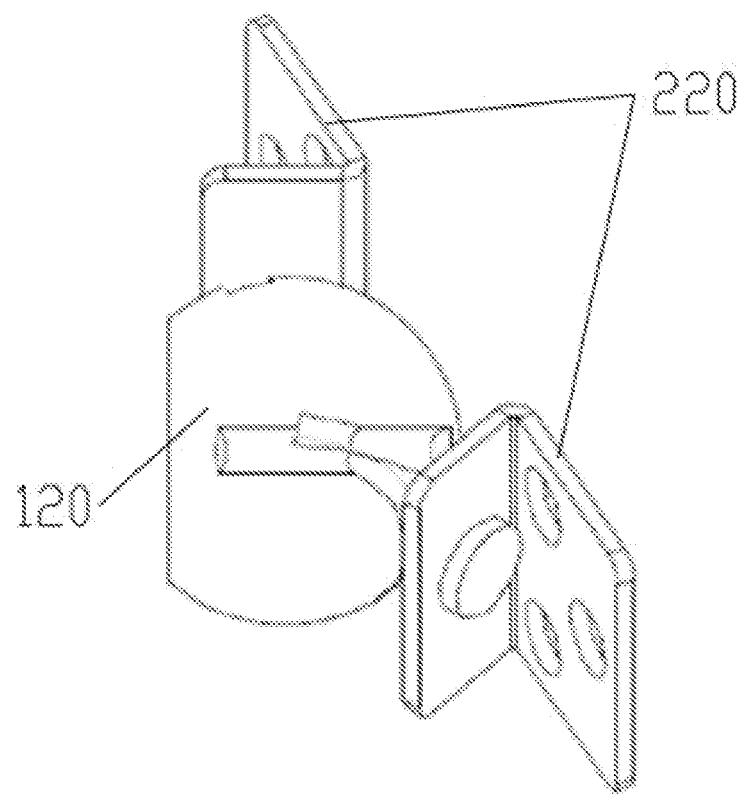
FIG. 20 illustrates a schematic structural diagram of a part of a support device according to embodiments of the present disclosure.
Figure 21:
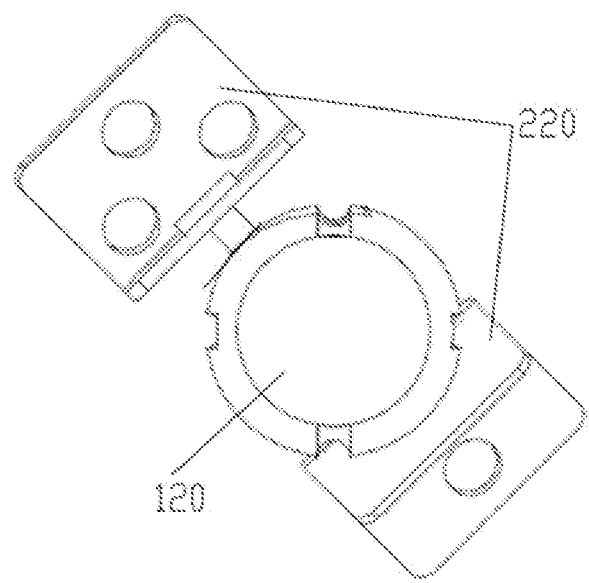
FIG. 21 illustrates a schematic structural diagram of a part of a support device according to embodiments of the present disclosure.
Figure 22:
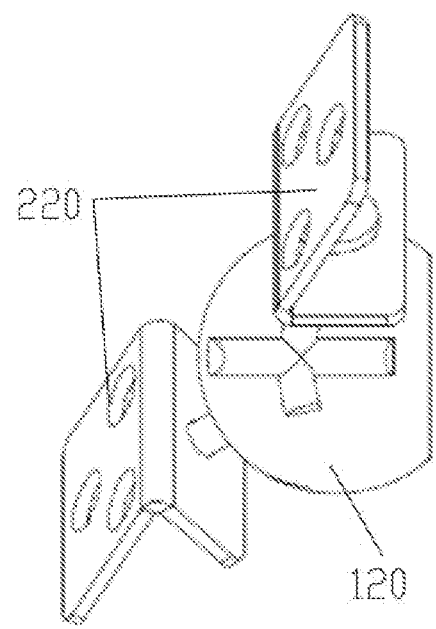
FIG. 22 illustrates a schematic structural diagram of a part of a support device according to embodiments of the present disclosure.
Figure 23:
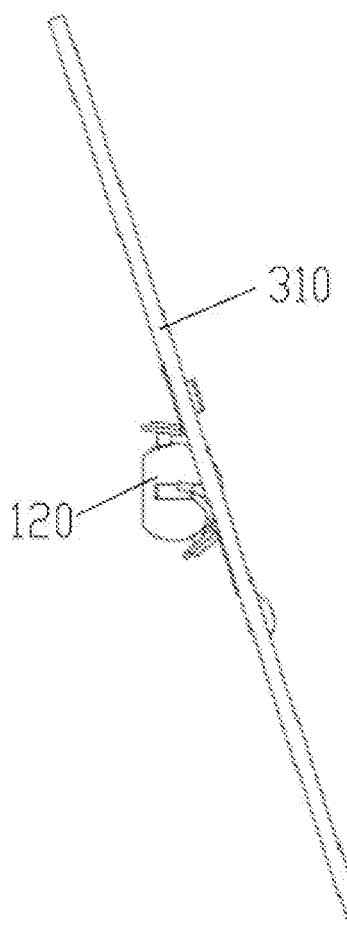
FIG. 23 illustrates a schematic structural diagram of a part of a support device according to embodiments of the present disclosure.
Figure 24:
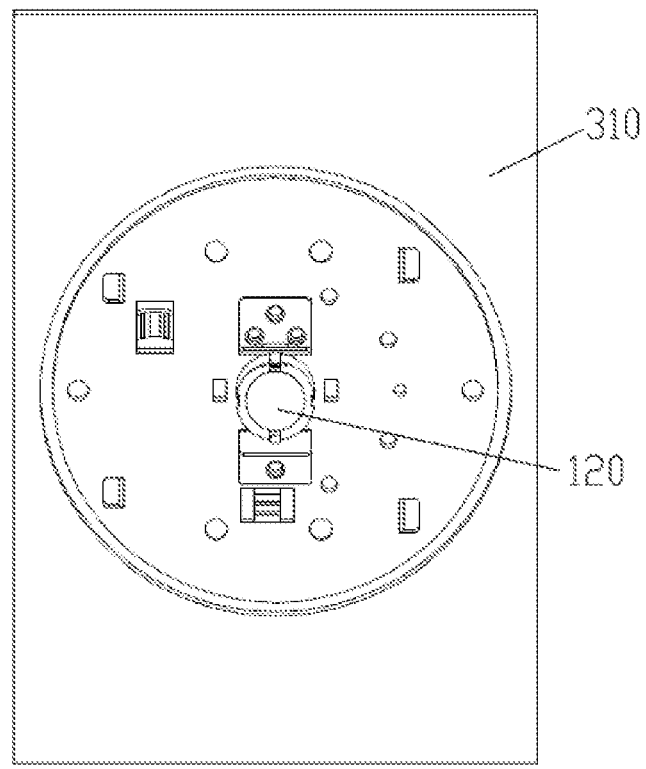
FIG. 24 illustrates a schematic structural diagram of a part of a support device according to embodiments of the present disclosure.
Figure 25:
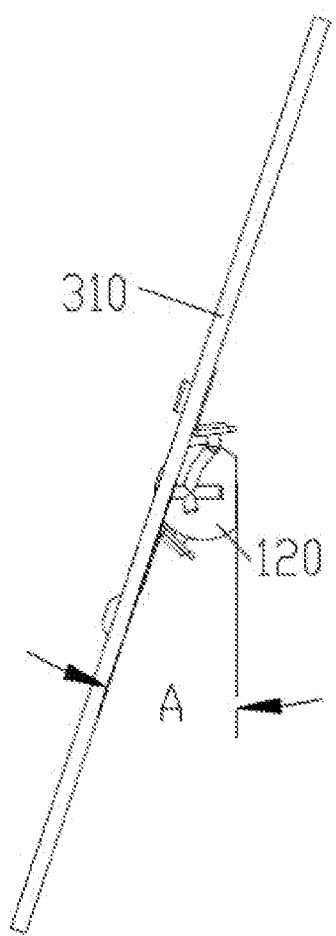
FIG. 25 illustrates a schematic structural diagram of a part of a support device according to embodiments of the present disclosure.

For example, as shown in FIG. 14, FIG. 15 and FIG. 16, the carrier assembly 200 is in a first state relative to the support structure 100. The first state may be a landscape state. During rotation of the carrier assembly 200 relative to the support structure 100 from the first state to a second state, as shown in FIG. 17, FIG. 18, and FIG. 19, the carrier assembly 200 may be in a state of 45 degrees relative to the support structure 100. As shown in FIG. 20, FIG. 21, and FIG. 22, the distances between the two fixing members 220 and the support structure 100 are different. When the carrier assembly 200 is rotated relative to the support structure 100 from the first state to the second state as shown in FIG. 23, FIG. 24, and FIG. 25, the carrier assembly 200 may be rotated for 90 degrees in the second direction relative to the support structure 100 from the first state to the second state. The second state may be the portrait state. Since the radians corresponding to the two first arch-shaped grooves 111 are different, the carrier assembly 200 may be rotated for a second angle A in the first direction relative to the support structure 100 as shown in FIG. 25. The first direction may be a pitch direction of the carrier assembly 200 relative to the support structure 100. The second direction may be perpendicular to the first direction.

FIG. 14, FIG. 15, and FIG. 16 are schematic diagrams showing that the support device is in the first state from different viewing angles. FIG. 17, FIG. 18, and FIG. 19 are schematic diagrams showing that the carrier assembly 200 is at the 45 degrees state in the second direction relative to the support structure 100 from different viewing angles. FIG. 20 is a partial view corresponding to FIG. 17. FIG. 21 is a partial view corresponding to FIG. 18. FIG. 22 is a partial view corresponding to FIG. 19. FIG. 23, FIG. 24, and FIG. 25 are schematic diagrams showing the support device in the second state from different viewing angles.

Figure 26:
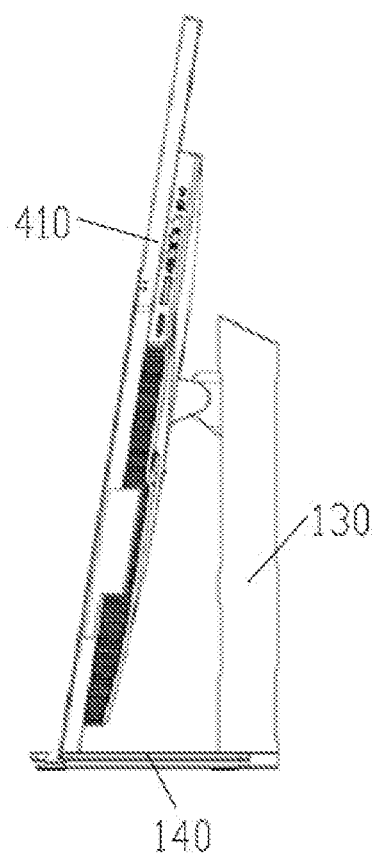
FIG. 26 illustrates a schematic structural diagram of a support device according to embodiments of the present disclosure.
Figure 27:
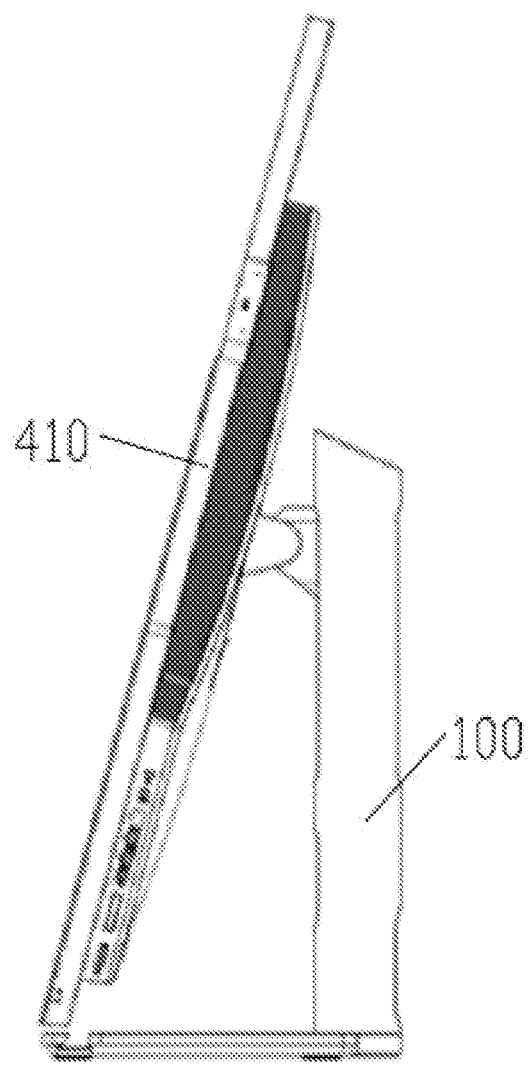
FIG. 27 illustrates a schematic structural diagram of a support device according to embodiments of the present disclosure.

When the host system and/or the display device 410 are converted from the first state to the second state, the host system and/or the display device 410 may easily touch the base 140 of the support structure 100 as shown in FIG. 26. With the two first arc-shaped grooves 111, the angle between the carrier assembly 200 and the support structure 100 may be adjusted in the first direction, and the angle between the carrier assembly 200 and the support structure 100 may be adjusted in the second direction. When the carrier assembly 200 is rotated relative to the support structure 100, since the angle between the carrier assembly 200 and the support structure 100 may be ensured in the pitch direction through the two first arc-shaped grooves 111, the host system and/or the display device 410 will not touch the base 140 of the support structure 100 as shown in FIG. 27. The adaptability of the support device may be greatly improved.

In some embodiments, as shown in FIG. 5 and FIG. 6, the connection groove 110 further includes two second arc-shaped grooves 112 that are arranged to intersect with the two first arc-shaped grooves 111, respectively. The two first connectors 210 may slide in the corresponding two second arc-shaped grooves 112, respectively, and the angle between the host system and/or the display device 410 and the support structure 100 may be adjusted in the first direction. Thus, the angle between the host system and/or the display device 410 and the support structure 100 may be adjusted in the first direction through the two second arch-shaped grooves 112.

The two second arc-shaped grooves 112 may be arranged on opposite sides of the second connector 120. Since the two second arc-shaped grooves 112 and the two first arc-shaped grooves 111 intersect with each other, the two first connectors 210 may slide from the two first arc-shaped grooves 111 into the two second arc-shaped grooves 112.

The two second arc-shaped grooves 112 may be arranged along the first direction. The first direction may be the pitch direction of the carrier assembly 200 relative to the support structure 100.

Figure 7:
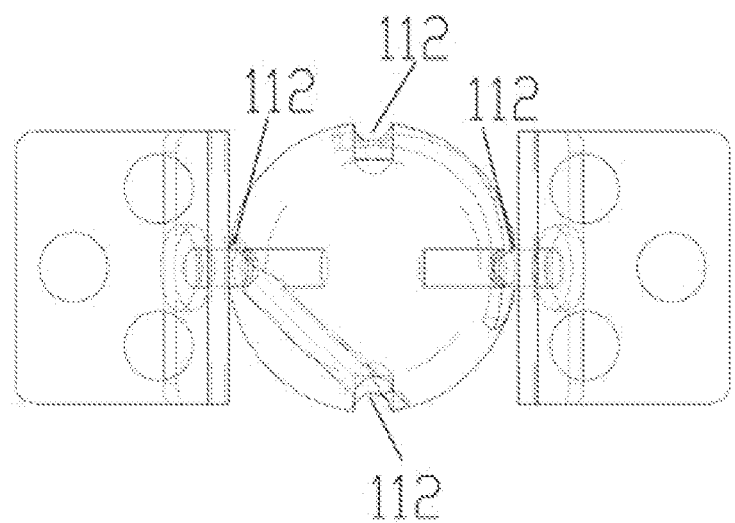
FIG. 7 illustrates a schematic structural diagram of a part of a support device according to embodiments of the present disclosure.

The connection groove 110 may be provided with a set of two second arc-shaped grooves 112 or two sets of two second arc-shaped grooves 112. For example, as shown in FIG. 7, the connection groove 110 is provided with the two sets of two second arc-shaped grooves 112. A first set of two second arc-shaped grooves 112 are arranged along the first direction. A second set of two second arc-shaped grooves 112 are arranged along a fourth direction. The first set of two second arc-shaped grooves 112 may pass through a first plane, and the second set of two second arc-shaped grooves 112 may pass through a second plane. Both the first plane and the second plane may pass through a ball center of the second connector 120. The first plane may be perpendicular to the second plane. The first direction may be the pitch direction of the carrier assembly 200 relative to the support structure 100. The fourth direction may be a left and right rotation direction of the carrier assembly 200 relative to the support structure 100.

Figure 28:
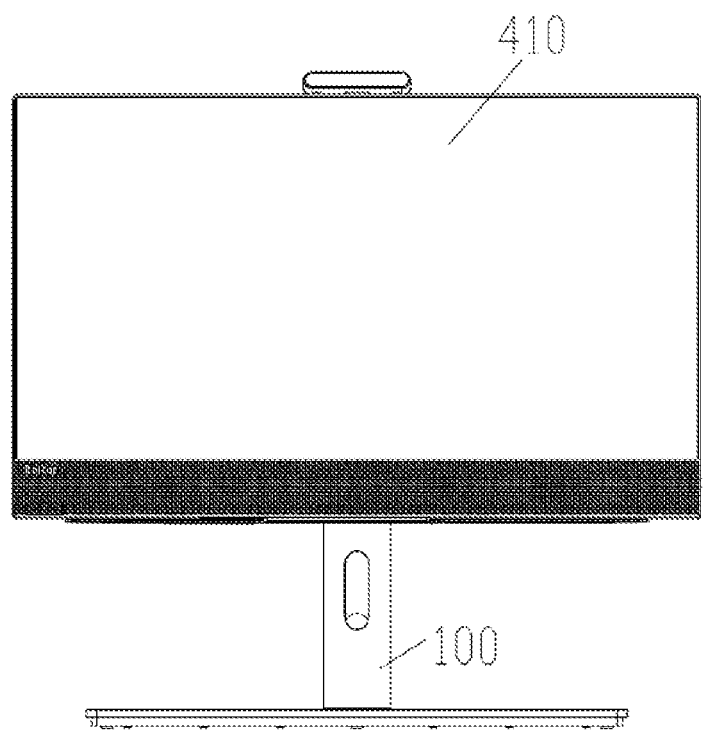
FIG. 28 illustrates a schematic structural diagram of a support device according to embodiments of the present disclosure.
Figure 29:
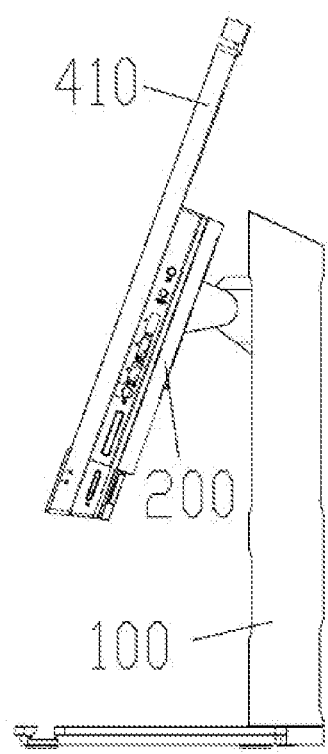
FIG. 29 illustrates a schematic structural diagram of a support device according to embodiments of the present disclosure.
Figure 30:
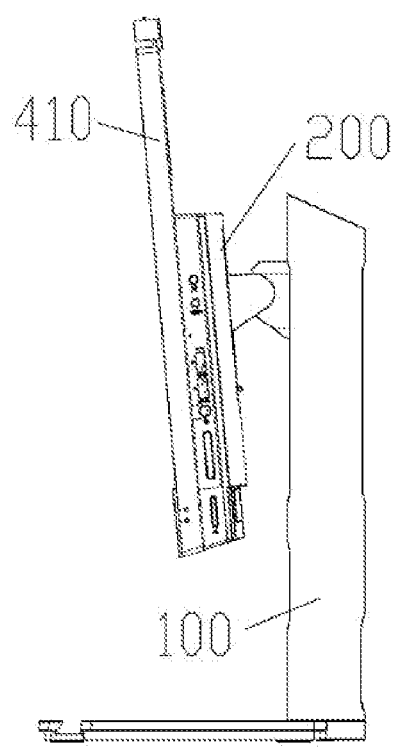
FIG. 30 illustrates a schematic structural diagram of a support device according to embodiments of the present disclosure.
Figure 31:
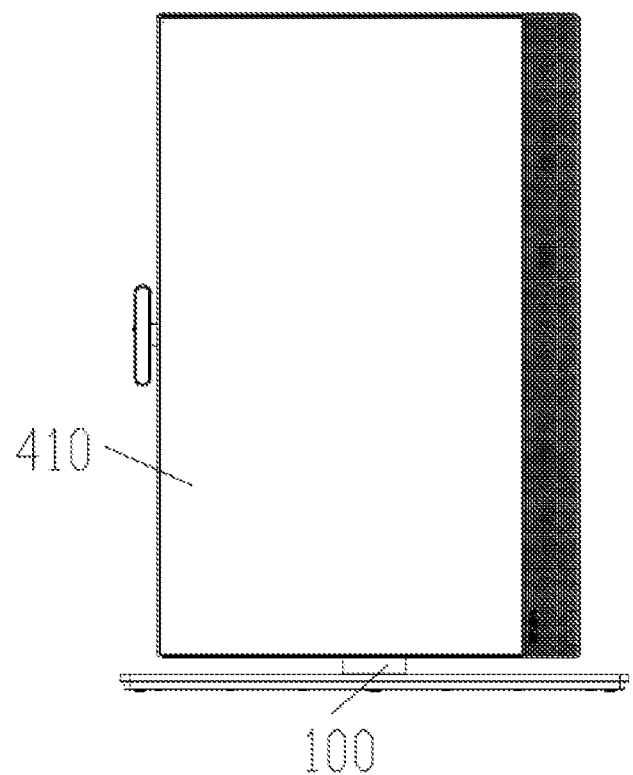
FIG. 31 illustrates a schematic structural diagram of a support device according to embodiments of the present disclosure.
Figure 32:
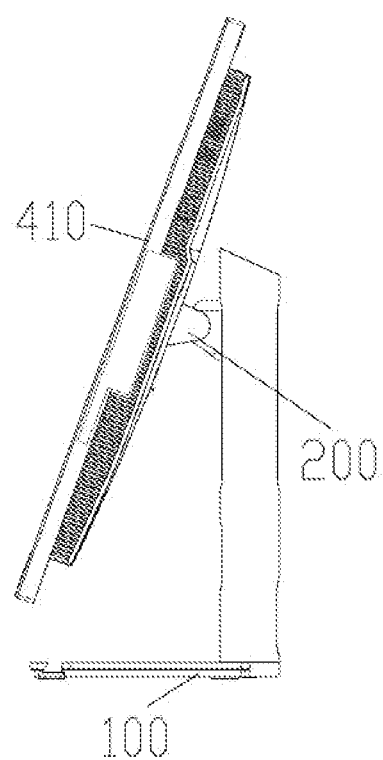
FIG. 32 illustrates a schematic structural diagram of a support device according to embodiments of the present disclosure.
Figure 33:
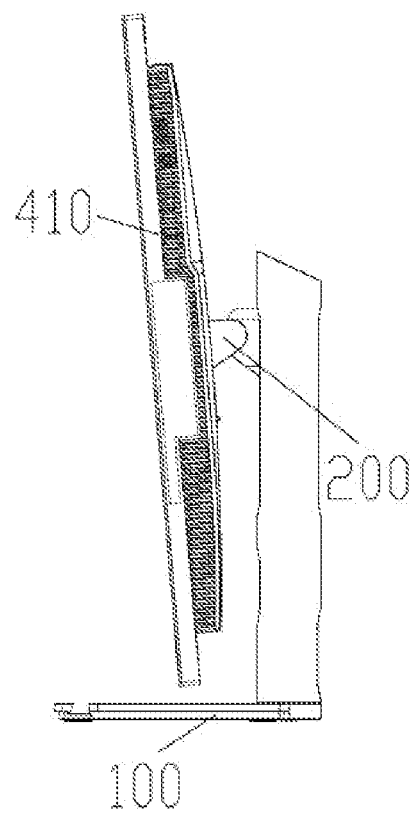
FIG. 33 illustrates a schematic structural diagram of a support device according to embodiments of the present disclosure.

FIG. 28, FIG. 29, and FIG. 30 show schematic diagrams of the support structure 100 supporting the host system and/or the display device 410 to be in the landscape state. The angle of the host system and/or the display device 410 in the pitch direction may be adjusted through the two second arc-shaped grooves 112. The host system and/or the display device 410 in the landscape state may be rotated to the portrait state through the two first arc-shaped grooves 111. As shown in FIG. 31, FIG. 32, and FIG. 33, the angle of the host system and/or the display device 410 in the pitch direction is adjusted through the two second arc-shaped grooves 112.

An angle between the host system and/or the display device 410 and the support structure 100 may be adjusted in a third direction through a relative rotation between the accommodation groove 330 and the carrier 230. The first connector 210 may slide in the connection groove 110 and may not slide in the connection groove 110. For example, when the first connector 210 slides to a limit position in the connection groove 110, and the accommodation groove 330 rotates relative to the carrier member 230, the first connector 210 may not slide relative to the connection groove 110. For another example, when the first connector 210 slides to a middle position in the connection groove 110, and the accommodation groove 330 is rotated relative to the carrier 230, the first connector 210 may slide relative to the connection groove 110.

The third direction may be the same as the second direction or different from the second direction.

The support device of embodiments of the present disclosure may include the support structure 100 including the connection groove 110 and the carrier assembly 200 at least configured to support the host system and/or the display device 410. The carrier assembly 200 may include the first connector 210. At least a part of the first connector 210 may be located in the connection groove 110 and may slide in the connection groove 110. The angles between the host system and/or the display device 410 and the support structure 100 in the first direction and/or the second direction may be adjusted by sliding the first connector 210 in the connection groove 110. Thus, the angle of the host system and/or the display device 410 may be adjusted through the support device to cause the host system and/or the display device 410 to have different states, which greatly improves the adaptability of the support device and the host system and/or the display device 410.

Embodiments of the present disclosure further provide an electronic device, including the support device and the display device 410 of embodiments of the present disclosure. The support device may be configured to support the host system and/or the display device 410. The host system and/or the display device may be connected to the carrier assembly 200.

The above are only specific embodiments of the present disclosure. However, the scope of the present disclosure is not limited to this. Those skilled in the art should easily think of modifications and replacements within the scope of the present disclosure. These modifications and replacements should be within the scope of the present disclosure. Thus, the scope of the present application should be subjected to the scope of the appended claims. should be covered within the scope of protection of this application.

What is claimed is:

1. A support device comprising:
a support structure including a connection groove;
a carrier assembly configured to support a host system and/or a display device and including two first connectors, at least a part of the two first connectors being located in the connection groove and sliding in the connection groove;
wherein an angle between the host system and/or the display device and the support structure is adjusted in a first direction and/or a second direction by sliding the two first connectors in the connection groove, and
wherein the connection groove includes two first arc-shaped grooves arranged opposite to each other, at least a part of each of the two first connectors is arranged in a corresponding one of the two first arc-shaped grooves, and radians corresponding to the two first arc-shaped grooves are different.

2. The support device of claim 1, wherein the support structure includes:
a base:
a column arranged on the base along a vertical direction; and
a second connector arranged on a top end of the column, the connection groove being arranged on the second connector; or
a beam arranged on the column, a first end of the beam being fixedly connected to the top end of the column, the second connector being arranged at a second end of the beam, and the connection groove being arranged on the second connector.

3. The support device of claim 2, wherein
the angle between the host system and/or the display device and the support structure being adjusted in the first direction and/or the second direction by sliding the two first connectors in the corresponding two first arc-shaped grooves, respectively.

4. The support device of claim 3, wherein the connection groove further includes:
two second arc-shaped grooves arranged to intersect with the two first arc-shaped grooves, respectively, the two first connectors sliding in the corresponding two second arc-shaped grooves, and the angle between the host system and/or the display device and the support structure being adjusted in the first direction.

5. The support device of claim 3, wherein:
the second connector provided with the connection groove has a spherical structure;

the two first arc-shaped grooves are correspondingly arranged on a surface of the spherical structure.

6. The support device of claim 1, wherein the carrier assembly further includes
two fixing members corresponding to the two first connectors, wherein an end of each of the two first connectors protruding from the connection groove being fixedly connected to a first fixing piece of a corresponding one of the two fixing members, a second fixing piece of the corresponding one of the two fixing members being fixed to a mounting member of the host system and/or the display device, and the two fixing members being arranged on two opposite sides of the second connector.

7. The support device of claim 6, wherein the carrier assembly further includes:
a carrier, the mounting member being an accommodation groove arranged on a back plate of the host system and/or the display device corresponding to the carrier, at least a part of the carrier being accommodated in the accommodation groove and rotatably connected to the back plate, the two fixing members being arranged on a side of the carrier facing away from the accommodation groove at an interval, an angle between the host system and/or the display device and the support structure being adjusted in a third direction through a relative rotation between the accommodation groove and the carrier.

8. The support device of claim 7, wherein:
a rotary connector is arranged in the accommodation groove;
the rotary connector rotates relative to the back plate; and
the carrier is detachably and rotatably connected to the back plate through the rotary connector.

9. The support device of claim 7, wherein a position limiting structure configured to limit a relative rotation angle between the carrier and the back plate is further arranged in the accommodation groove.

10. An electronic device comprising:
a host system and/or a display device; and
a support device including:
a support structure including a connection groove; and
a carrier assembly configured to support the host system and/or the display device and including two first connectors, at least a part of the two first connectors being located in the connection groove and sliding in the connection groove; wherein:
the host system and/or the display device are connected to the carrier assembly;
an angle between the host system and/or the display device and the support structure is adjusted in a first direction and/or a second direction by sliding the two first connectors in the connection groove;
the connection groove includes two first arc-shaped grooves arranged opposite to each other;
at least a part of each of the two first connectors is arranged in a corresponding one of the two first arc-shaped grooves; and
radians corresponding to the two first arc-shaped grooves are different.

11. The electronic device of claim 10, wherein the support structure includes:
a base;
a column arranged on the base along a vertical direction; and a second connector arranged on a top end of the column, the connection groove being arranged on the second connector; or
a beam arranged on the column, a first end of the beam being fixedly connected to the top end of the column, the second connector being arranged at a second end of the beam, and the connection groove being arranged on the second connector.

12. The electronic device of claim 11, wherein
the angle between the host system and/or the display device and the support structure being adjusted in the first direction and/or the second direction by sliding the two first connectors in the corresponding two first arc-shaped grooves, respectively.

13. The electronic device of claim 12, wherein the connection groove further includes:
two second arc-shaped grooves arranged to intersect with the two first arc-shaped grooves, respectively, the two first connectors sliding in the corresponding two second arc-shaped grooves, and the angle between the host system and/or the display device and the support structure being adjusted in the first direction.

14. The electronic device of claim 12, wherein:
the second connector provided with the connection groove has a spherical structure;
the two first arc-shaped grooves are correspondingly arranged on a surface of the spherical structure.

15. The electronic device of claim 10, wherein the carrier assembly further includes
two fixing members corresponding to the two first connectors, wherein an end of each of the two first connectors protruding from the connection groove being fixedly connected to a first fixing piece of a corresponding one of the two fixing members, a second fixing piece of the corresponding one of the two fixing members being fixed to a mounting member of the host system and/or the display device, and the two fixing members being arranged on two opposite sides of the second connector.

16. The electronic device of claim 15, wherein the carrier assembly further includes:
a carrier, the mounting member being an accommodation groove arranged on a back plate of the host system and/or the display device corresponding to the carrier, at least a part of the carrier being accommodated in the accommodation groove and rotatably connected to the back plate, the two fixing members being arranged on a side of the carrier facing away from the accommodation groove at an interval, an angle between the host system and/or the display device and the support structure being adjusted in a third direction through a relative rotation between the accommodation groove and the carrier.

17. The electronic device of claim 16, wherein:
a rotary connector is arranged in the accommodation groove;
the rotary connector rotates relative to the back plate; and
the carrier is detachably and rotatably connected to the back plate through the rotary connector.

18. The electronic device of claim 16, wherein a position limiting structure configured to limit a relative rotation angle between the carrier and the back plate is further arranged in the accommodation groove.

* * * * *